(12) United States Patent
Stenvall

(10) Patent No.: US 6,457,729 B2
(45) Date of Patent: Oct. 1, 2002

(54) WHEEL SUSPENSION FOR A VEHICLE

(75) Inventor: Lars Stenvall, Ljungskile (SE)

(73) Assignee: Volvo Personvagnar AB (SE)

( * ) Notice: Subject to any disclaimer, the term of this patent is extended or adjusted under 35 U.S.C. 154(b) by 0 days.

(21) Appl. No.: 09/681,680

(22) Filed: May 18, 2001

(30) Foreign Application Priority Data

May 18, 2000 (SE) ............................................... 0001824

(51) Int. Cl.[7] ................................................. B60G 3/10
(52) U.S. Cl. ......................... 280/124.134; 280/124.171
(58) Field of Search .................. 280/124.134, 124.106, 280/124.111, 124.145, 124.171

(56) References Cited

U.S. PATENT DOCUMENTS

| 2,643,897 A | 6/1953 | Chowning |
| 2,732,219 A | 1/1956 | Miller |
| 2,942,893 A | 6/1960 | Nallinger |
| 4,457,536 A | * 7/1984 | Rumpel |
| 5,016,861 A | 5/1991 | Thompson et al. |
| 6,029,987 A | 2/2000 | Hoffman et al. |
| 6,378,881 B2 | * 4/2002 | Stenvall ............... 280/124.171 |

FOREIGN PATENT DOCUMENTS

| CN | 272132 A | 2/1951 |
| EP | 0507975 A | 10/1992 |
| FR | 636068 A | 3/1928 |
| FR | 776864 A | 2/1935 |
| FR | 805811 A | 12/1936 |
| GB | 232520 A | 4/1925 |
| GB | 264074 A | 1/1927 |
| GB | 769391 A | 3/1957 |
| JP | 62012405 A | 1/1987 |
| JP | 62034807 A | 2/1987 |

* cited by examiner

Primary Examiner—Paul N. Dickson
Assistant Examiner—Ruth Ilan
(74) Attorney, Agent, or Firm—Howrey, Simon, Arnold & White LLP

(57) ABSTRACT

The invention provides a wheel suspension for a vehicle, wherein both a right wheel and a left wheel are carried by a linkage having a first end section and a second end section. The first end section is connected to the vehicle on the opposite side of the vehicle in relation to the respective wheel, and the second end section is likewise connected to its respective wheel. The invention is particulary significant in that the linkages are substantially U-shaped. Each linkage has two legs which are mainly parallel and extend in a substantially transverse direction of the vehicle. The free ends of the linkages constitute the first end section. The linkages also have a closed section connecting the legs. This closed section constitutes the second end section, whereby an open space is defined between the legs of each linkage. At least one leg on one of the linkages extends into the open space between the legs of the other linkage.

13 Claims, 10 Drawing Sheets

WHEEL SUSPENSION FOR A VEHICLE

BACKGROUND OF INVENTION

1. Technical Field.

The present invention relates to a wheel suspension for a vehicle comprising an in the longitudinal direction of the vehicle transverse spring means, such as a leaf spring. The wheel suspension may advantageously be used both for front and rear suspensions.

2. Background Art.

Modern wheel suspensions have become more and more complicated in order to meet increasing demands for a comfortable ride and safe performance. Many known types of wheel suspensions are of the so called multi-link type, which comprise a number of mutually connected pivotable linkages. By using an ingenious design of these linkages it is possible to achieve an almost optimum compromise between, e.g., ride comfort and performance (such as cornering, rolling etc.) in accordance with the desired character of the vehicle. A disadvantage of this type of multi-link suspension is that the number of components, as well as the number of moving parts, are high, leading to higher costs justifiable only for more expensive vehicles. Further, the relatively large number of moving parts, such as ball joints, will eventually result in higher maintenance costs due to wear.

For less expensive vehicles it is desirable to provide a wheel suspension having a simpler design with as few moving parts as possible enabling it to be manufactured at a lower cost, while still fulfilling the requirements of ride comfort and performance necessary for this type of vehicle.

A further problem with known wheel suspensions, such as the currently dominating so-called McPherson-type, is the use of bulky suspension struts with coiled springs, which extend into the engine compartment, luggage compartment or passenger space of the vehicle, taking up valuable space that could be better utilized. The engine compartment in modern cars is often reduced by design limitations, which, together with increasing demand for engine performance, makes it desirable to make maximum use of the available space for the engine and its peripheral equipment. As far as the luggage compartment is concerned, the need for a low and level loading surface without extending struts is obvious.

A further problem with extending suspension struts is that their rigidity and upright position in the engine compartment present a potentially increased risk of injury to the body of a pedestrian, should a front-end collision occur in which the pedestrian strikes the hood of the vehicle. The hood itself, as well as other parts of the vehicle body, has been specially designed to absorb the energy of the collision by means of controlled deformation. At moderate speeds this results in a relatively gentle deceleration of the body of the pedestrian, as compared to the body of the pedestrian striking the relatively rigid suspension struts after an initial deformation of the hood. For this reason it is desirable to eliminate struts of this type from the engine compartment.

SUMMARY OF INVENTION

The present invention provides a wheel suspension for a vehicle, wherein both the right and left wheels are carried by a linkage having a first and second end section. The first end section is connected to the vehicle on the side of the vehicle opposite its respective wheel, and the second end section is likewise connected to its respective wheel.

The invention is particularly significant in that the linkages are substantially U-shaped, with each having two legs that are mainly parallel and extend in a substantially transverse direction of the vehicle. The free ends of the linkages constitute the first end section. The linkages further have a closed section connecting the legs. The closed section constitutes the second end section, whereby an open space is defined between the legs of each linkage. At least one leg on one of the linkages extends into the open space between the legs of the other linkage.

According to a preferred embodiment of the invention, the legs of one linkage are provided with attachment points on the vehicle that are displaced in the longitudinal direction of the vehicle in relation to corresponding attachment points for the other linkage.

According to a further preferred embodiment of the invention, a leg of one linkage is positioned substantially within the open space of the other linkage. The linkages are pivotably journaled in the vehicle, preferably around axes that are mainly parallel to the longitudinal direction of the vehicle.

The second end section of each linkage is preferably connected to a spring means. The spring means is connected to the vehicle and is preferably a leaf spring placed transverse to the longitudinal direction of the vehicle. The second end section of each linkage is also connected to a shock absorber that is connected to the vehicle.

In an alternative embodiment, the linkages are rigidly connected to the vehicle and are, at least in part, made from a resilient material such as a composite material.

Additionally, according to an advantageous and simple embodiment, a wheel spindle axle is rigidly connected to the second end section of each linkage. Alternatively, the entire wheel spindle is rigidly connected to the second end section.

With the present invention, a simple and cost effective wheel suspension is achieved having fewer component parts and fewer moving parts than a traditional wheel suspension using suspension struts of the so-called McPherson-type. When the wheel suspension of the present invention is used as a rear wheel suspension, a low and level loading compartment is possible as the need for bulky struts has been eliminated. The relatively low number of moving parts also reduces the need for maintenance.

A further advantage with the wheel suspension of the present invention is that it may be used for both the rear and front wheel suspensions. This allows the economical use of many of the component parts in both the front and rear ends of the vehicle.

In summary, the wheel suspension of the present invention is an economically advantageous alternative to more complex wheel suspensions of the so-called multi-link type.

BRIEF DESCRIPTION OF DRAWINGS

Following, the invention will be described in detail with reference to the attached drawings, in which.

DETAILED DESCRIPTION

Figure 1:
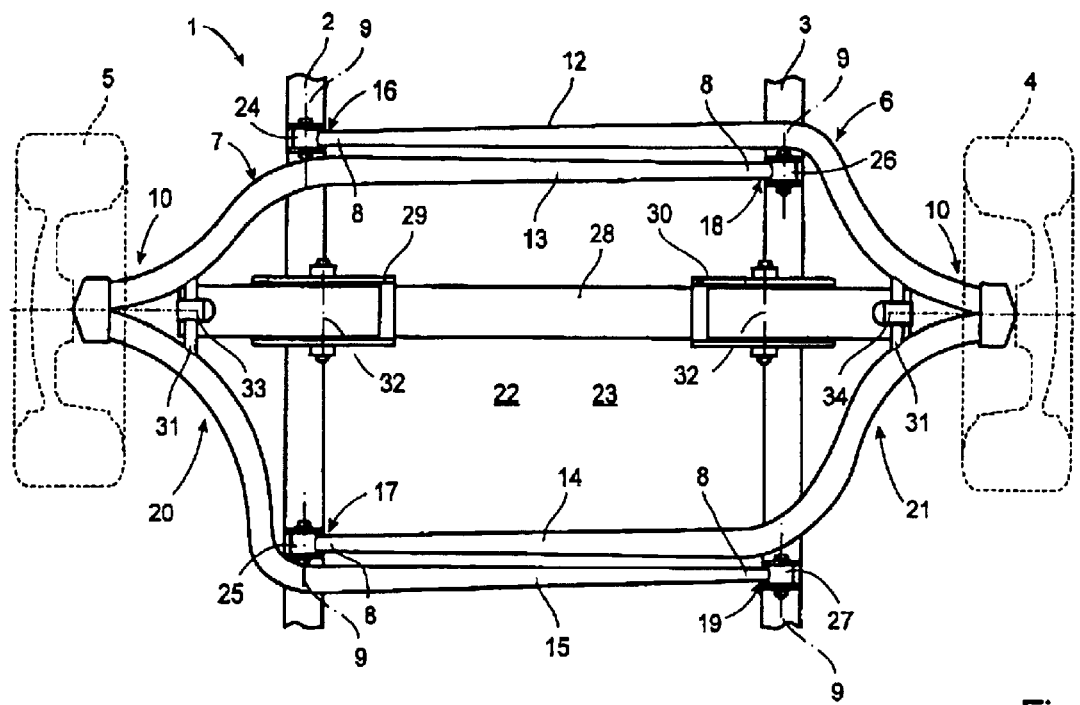
FIG. 1 illustrates a bottom plane view of a wheel suspension according to a first embodiment of the invention.

In FIG. 1 the reference numeral 1 generally denotes a wheel suspension for a vehicle according to an advantageous embodiment of the invention. In the figure, the wheel suspension 1 is mounted on load-bearing beams 2, 3 that are part of the chassis of the vehicle. For reasons of clarity, the remaining vehicle has been excluded. The beams 2, 3 can, as illustrated, be part of a conventional frame of a vehicle with rectangular frame sections. However, they can also be a part of a more complex chassis structure (not shown) of a composite type, wherein the beams 2, 3 may have many cross-sections. Accordingly, the beams 2, 3 may be designed to be integrated in, for example, instance, a so-called sandwich construction platform. The wheel suspension 1 may be used advantageously as both a front and rear wheel suspension.

Figure 2:
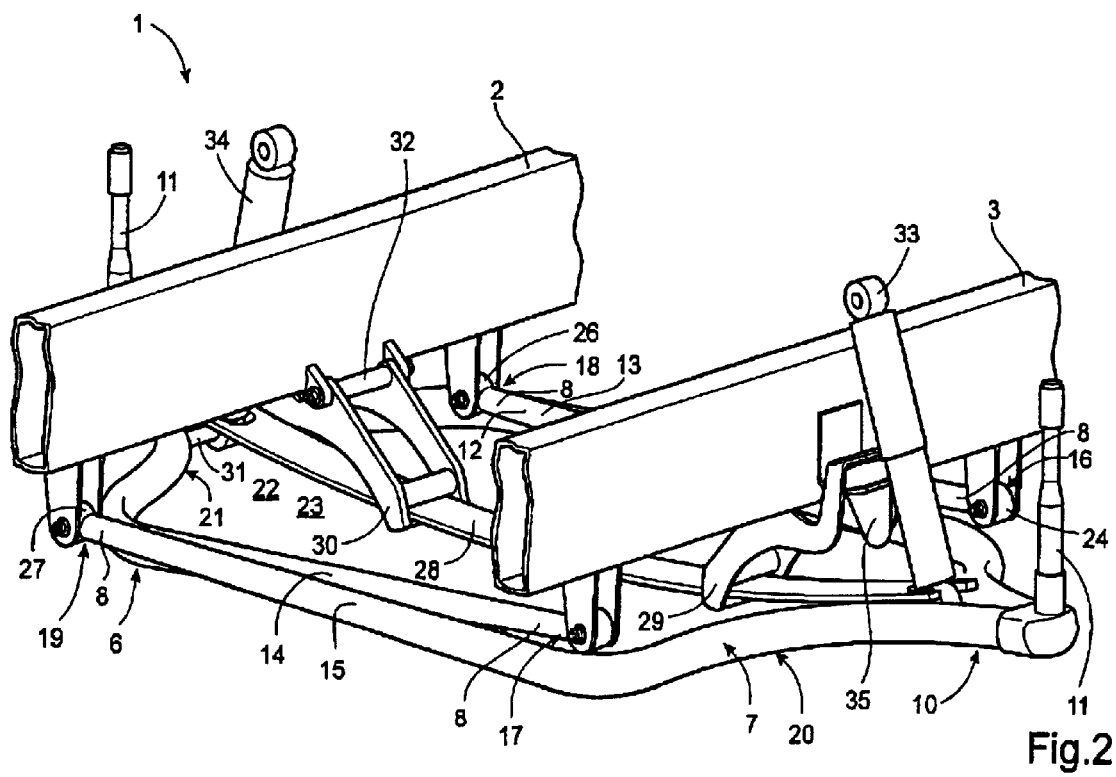
FIG. 2 illustrates a front perspective view of a wheel suspension according to the embodiment of FIG. 1.

As can be seen from the figure, a right wheel 4 and left wheel 5 are each carried by a substantially U-shaped, single linkage 6, 7. The normal forward direction of travel of the vehicle is directed downwards in FIG. 1, with the wheel suspension 1 viewed from below. In FIG. 2 it is viewed from an oblique angle from the front and above. Furthermore, the wheels 4, 5 are drawn using dotted lines in FIG. 1, as to avoid concealing parts of the wheel suspension 1.

Each linkage 6, 7 has a first end section 8 that is pivotably journaled in the beams 2 and 3, respectively. The linkages are on the opposite side of the vehicle in relation to their respective wheels, with reference to an imaginary longitudinal and vertical plane of symmetry (not shown) through the vehicle. The linkages 6, 7 are journaled on axes 9, which are parallel to the longitudinal direction of the vehicle, i.e., in the vertical direction in the figure. Hence, the linkage 6 of the right wheel 4 is journaled in the beam 3 on the left half of the vehicle, and the linkage 7 of the left wheel 5 is journaled in the beam 2 on the right half of the vehicle.

In addition, each linkage 6, 7 comprises a second end section that is connected to the respective wheel 4, 5 by means of a wheel spindle axis 11 rigidly attached to the end section 10. As such, there is no need for a joint between linkage 6, 7 and wheel spindle axis 11, thereby reducing the number of moving parts and weight. In an alternative, but not shown, embodiment suitable for a rear wheel suspension with non-steerable wheels 4, 5, an entire wheel spindle may be rigidly attached to the end section 10.

Each linkage 6, 7 is provided with two substantially parallel legs 12, 13, 14, 15, which extend in the transverse direction of the vehicle. The free ends 16, 17, 18, 19 of the legs 12, 13, 14, 15 make up the first end section 8. The linkages 6, 7 further have a closed section 20, 21 connecting the legs, wherein an open space 22, 23 is defined between the legs 12, 13, 14, 15 of each linkage 6, 7. In the embodiment shown, one leg 13, 14 of each linkage 6, 7 extends into the open space 22, 23 between the legs 12, 13, 14, 15 of the other linkage 6, 7.

The legs 12, 14 of one of the linkages 6 are provided with attachment points 24, 25 on the vehicle. These points are displaced in the longitudinal direction of the vehicle in relation to the corresponding attachment point 26, 27 for the legs 13, 15 of the other linkage 7. In this manner the linkages 6, 7 can be pivoted independently of each other around the axes 9.

The linkages 6, 7 have a relatively long length compared to known, more complex wheel suspensions of the so-called multi-link type, giving the suspension of the present invention particularly good lateral suspension properties. Movement of the spring in the longitudinal direction of the vehicle around an axis perpendicular thereto is advantageous from a comfort point of view. The lateral suspension properties can be controlled to suit different applications simply by varying the stiffness of the linkages 6, 7 to give the desired properties. Hence, linkages 6, 7 with a higher stiffness will allow less lateral movement, and vice versa.

As can be seen from FIG. 1 and FIG. 2, the second end section 10 of each linkage 6, 7 is connected to a single and, in relation to the longitudinal direction of the vehicle, transverse leaf spring 28. In turn, the leaf spring is connected to the beams 2, 3 of the vehicle by means of two spring seats 29, 30. The leaf spring 28 is in contact with a strut 31 on either linkage 6, 7. The strut 31 extends between the legs 12, 13, 14, 15 in the longitudinal direction of the vehicle. Also, each spring seat 29, 30 is pivotable around a suspension axis 32 arranged in the longitudinal direction of the vehicle. The arrangement of using a leaf spring in combination with the specially designed spring seats is in itself a separate invention, which will not be described here due to the fact that the current invention relating to the wheel suspension 1 is well suited for use with other suspension systems, e.g., systems comprising conventional coiled springs or torsion springs.

Also, the second end section 10 of each linkage 6, 7 is connected to a shock absorber 33, 34 that is connected to the vehicle in a conventional manner (not shown). An upper deflection limiting device 35 comprising a rubber body, or similar, is attached to the respective beam 2, 3.

Figure 3:
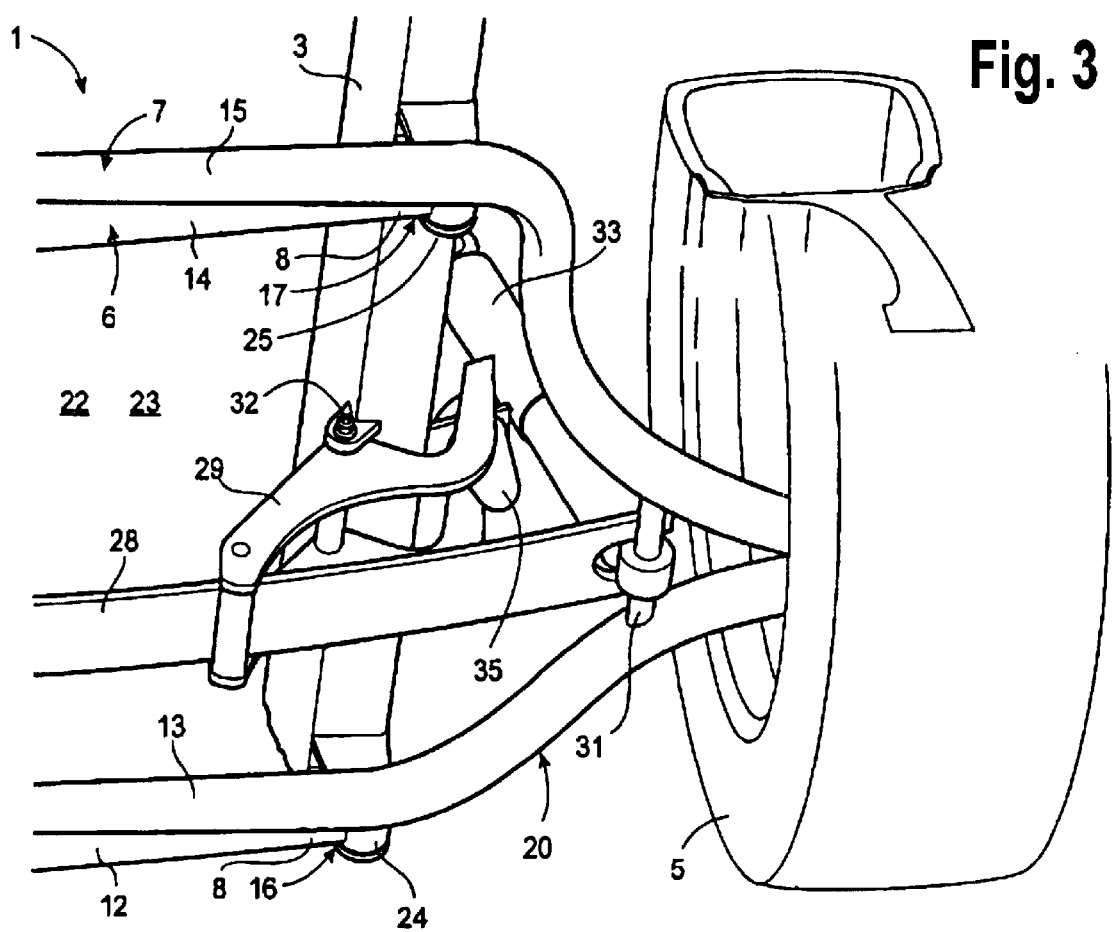
FIG. 3 illustrates an enlarged bottom perspective view of an attachment for a linkage being attached to the wheel at one end.
Figure 4:
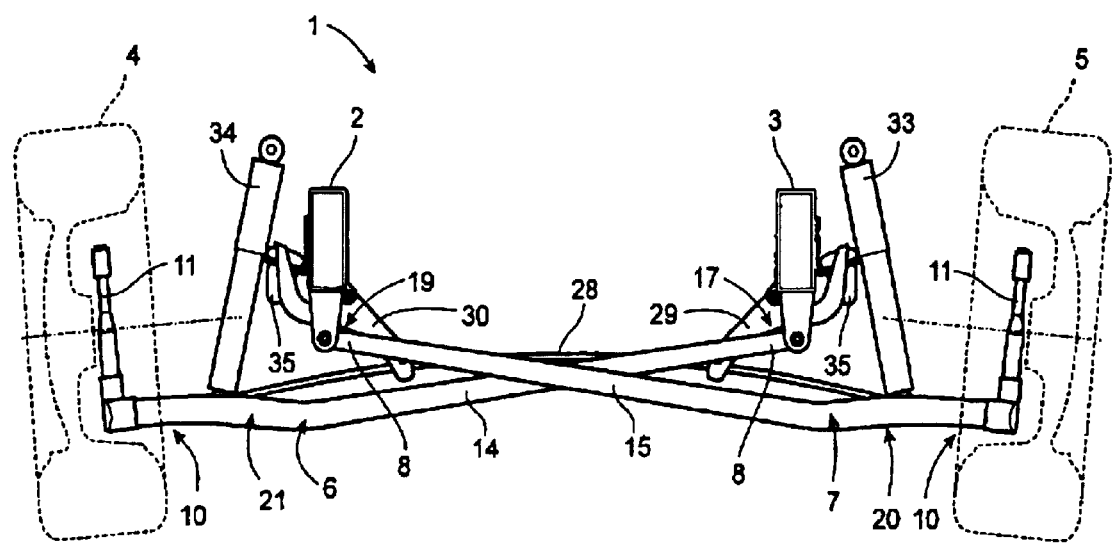
FIG. 4 illustrates a front plane view of a wheel suspension with the wheels at an extreme lower position, equivalent to the vehicle being lifted clear off the ground.
Figure 5:
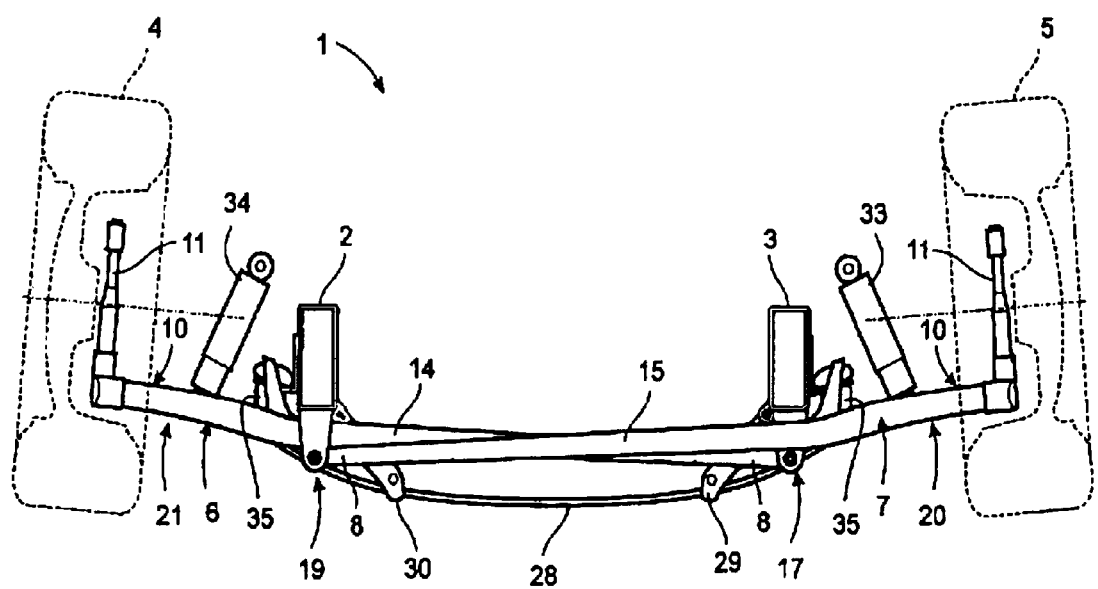
FIG. 5 illustrates a front plane view of a wheel suspension with the wheels at an extreme upper position.
Figure 6:
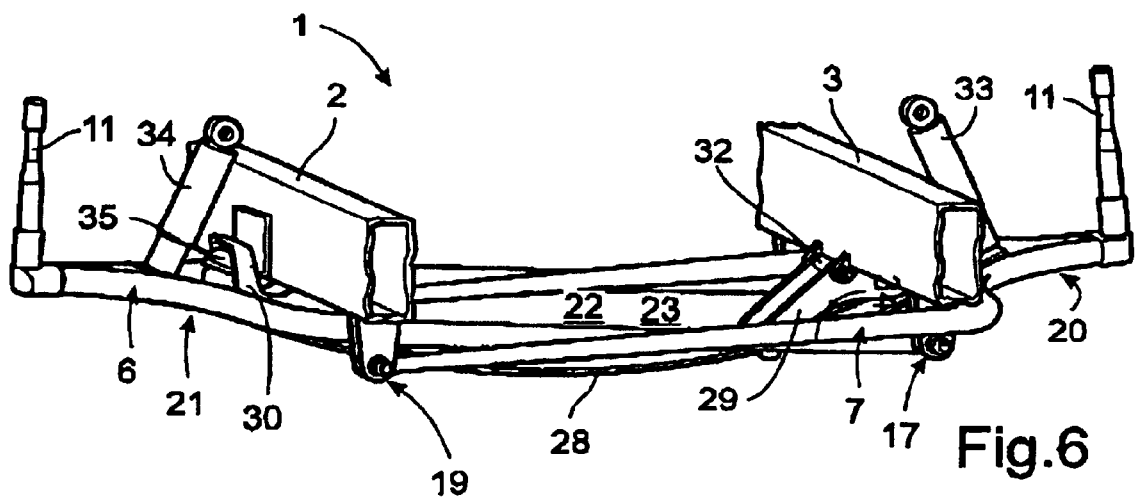
FIG. 6 illustrates a front perspective of the wheel suspension in the extreme upper position of FIG. 5.
Figure 7:
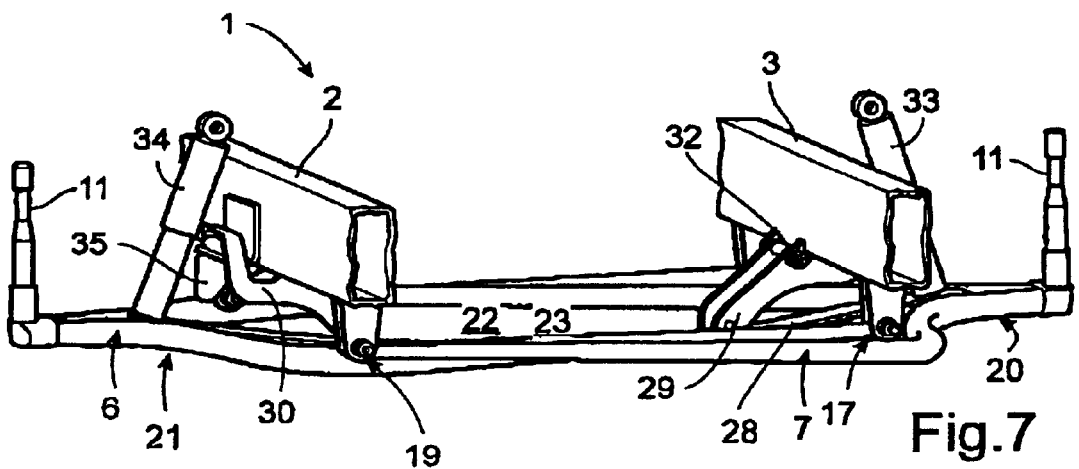
FIG. 7 illustrates a front perspective view of a wheel suspension under normal loading.
Figure 8:
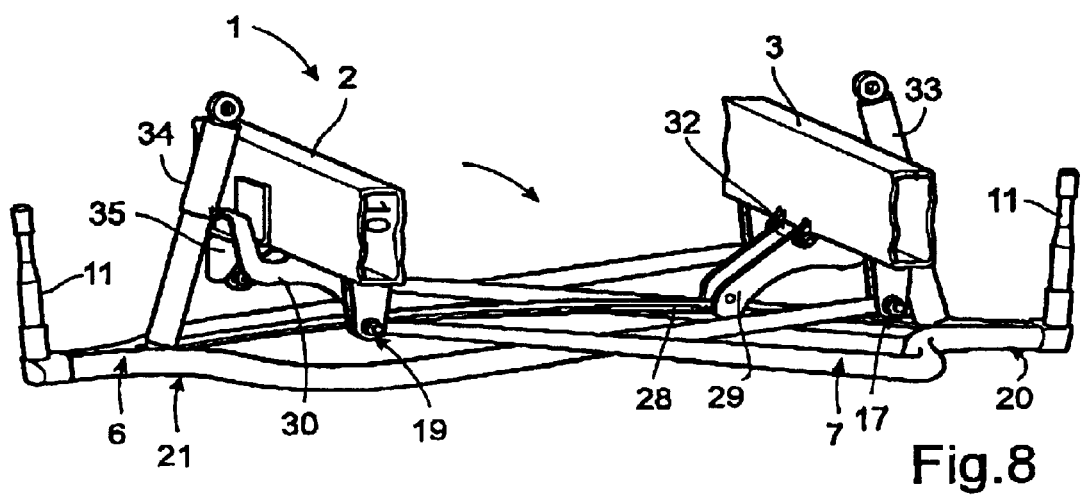
FIG. 8 illustrates a front perspective view of the wheel suspension in the extreme lower position of FIG. 4.

FIG. 3 illustrates how a spring seat 29 is pivotable around its suspension axis 32. FIG. 4 illustrates the wheel suspension with the wheels suspended in an extreme lower position corresponding to the vehicle having been lifted off the ground (not shown). FIG. 5 illustrates the same wheel suspension 1 with the wheels 4, 5 in an extreme upper position, with the leaf spring 28 in contact with the upper deflection limiting means 35. For the purpose of explaining the movements of the wheel suspension 1, FIGS. 6–8 show perspective views of three different positions, or load conditions, with FIG. 6 illustrating the extreme upper position, FIG. 7 illustrates a normal load condition and FIG. 8 illustrates the extreme lower position.

Figure 9:
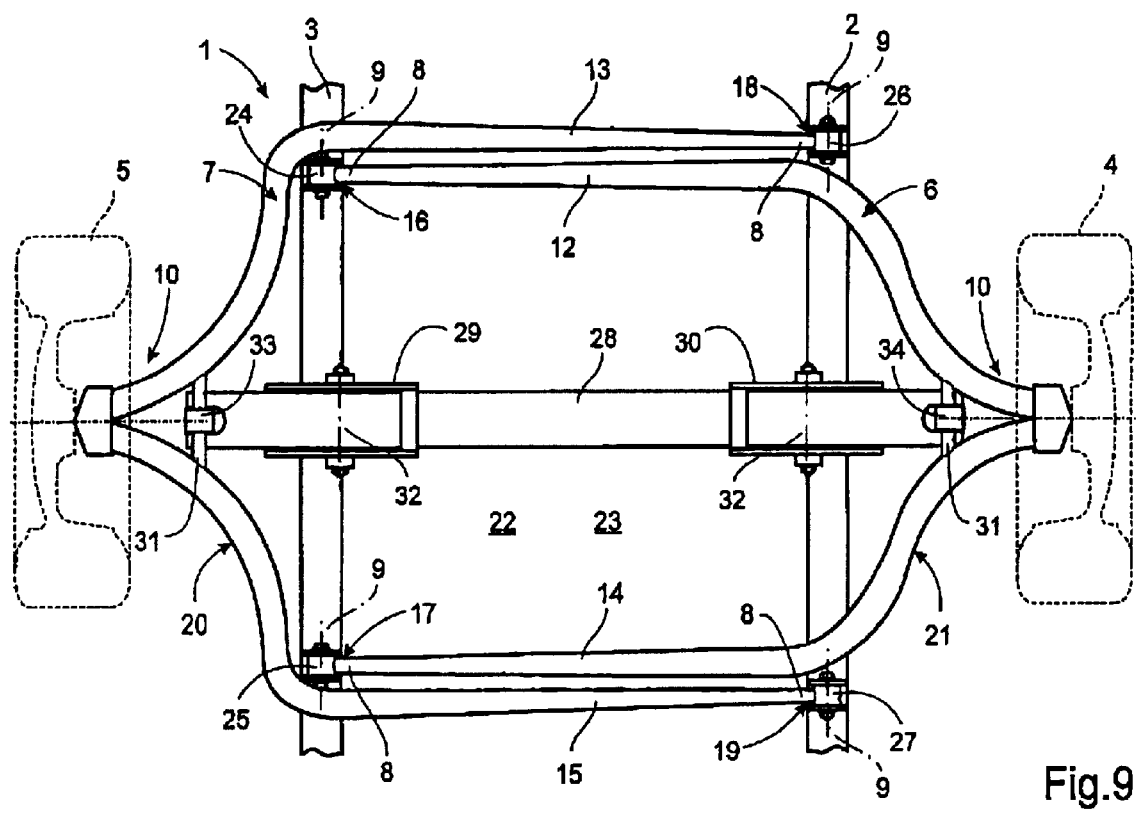
FIG. 9 illustrates a bottom plane view of a second embodiment of the invention, wherein the leg of one linkage is positioned substantially within the open space of the other linkage.

FIG. 9 illustrates an alternative, second embodiment of the invention, where the legs 12, 14 of one linkage 6 are placed substantially within the open space 22 of the second linkage 7, i.e., between its legs 13, 15. However, both legs 12, 14 of one linkage 6 are provided with attachment points 24, 25 to the vehicle, with the points displaced in the longitudinal direction of the vehicle in relation to the corresponding attachment points 26, 27 for the legs 13,15 of the other linkage 7.

Figure 10:
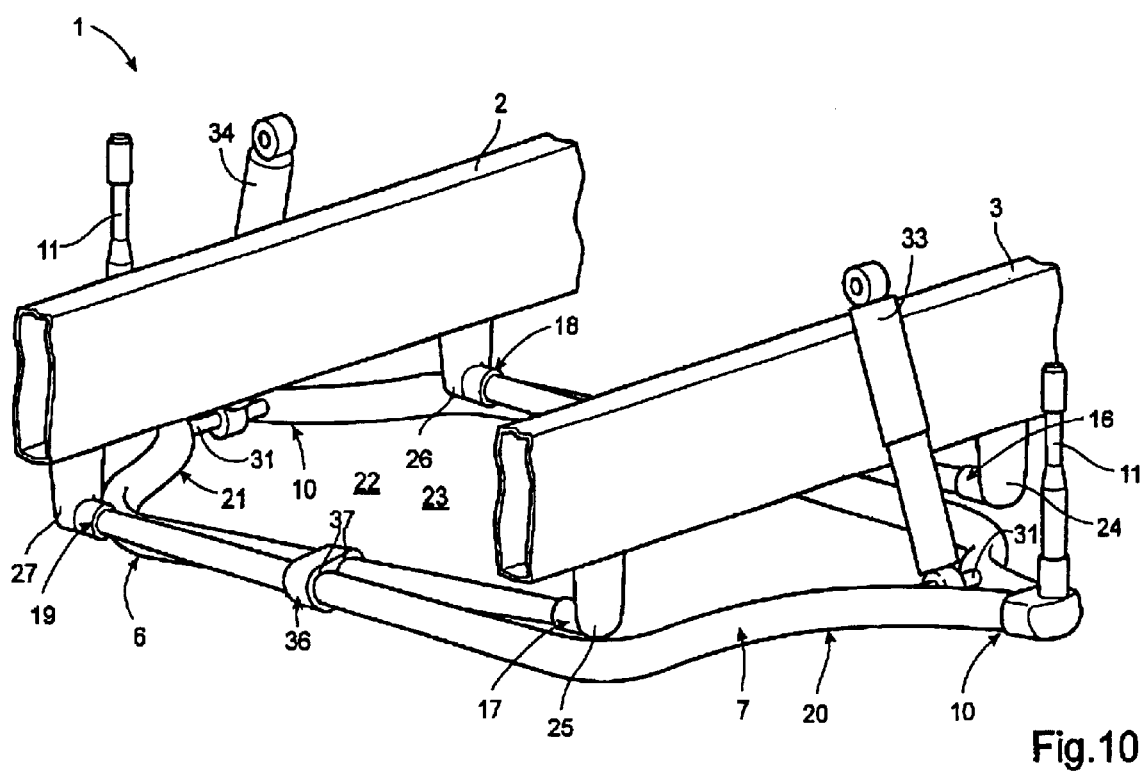
FIG. 10 illustrates a front perspective of a third embodiment of the invention, wherein the linkages are rigidly attached to the vehicle and are made from a resilient composite material.

FIG. 10 illustrates a third embodiment of the invention where the linkages are rigidly connected to the vehicle at attachment points 24, 25, 26, 27 and are made from a resilient composite material. In this manner the linkages 6, 7 function as spring means, and the sprung motion arises through elastic deflection of the legs 12, 13, 14, 15 of the linkages 6, 7. As the need for a leaf spring 28, as described in the earlier embodiments, has been eliminated, an advantageous weight saving can be made. Additionally, a deflector or deflection limiting means (not shown) can be arranged such that it is integrated with the shock absorbers 33, 34. The composite material in the linkages can, for example, comprise woven glass or carbon fibers. This third embodiment also offers a certain roll inhibiting function through a connection element 36 with a certain flexible resistance. The connection element movably connects the respective crossing legs 12, 13 and 14, 15 of the linkages 6, 7. The connection element 36 is made from a flexible material, such as rubber or a rubber-like material, and is provided with two through holes 37 through which the respective crossing legs 12, 13 and 14, 15 of the linkages 6, 7 extend. During a roll movement on one side of the vehicle, the linkage 6 on that side is deflected upwards while the opposite linkage 7 is carried along with this upward deflection by means of the connecting element 36.

The wheel suspension 1 according to the invention may also be used with different types of spring means, other than the leaf spring 28 shown in the figures, such as coiled springs, torsion springs etc. The shape of the linkages may also be varied within the set conditions.

The invention is not limited to the embodiments described above and in the attached drawings, but may be freely modified within the scope of the subsequent claims.

What is claimed is:

1. A wheel suspension for a vehicle, comprising a right wheel and a left wheel, each carried by a linkage having a first end section and a second end section, said first end section connected to the vehicle on the opposite side of the vehicle in relation to the respective wheel, and said second end section is connected to its respective wheel, wherein:

said linkages are substantially U-shaped, each having two legs that are mainly parallel and extending in a substantially transverse direction of the vehicle, the free ends comprising said first end section, and which linkages further comprise a closed section connecting said legs prior to connecting to its respective wheel, said closed section comprising said second end section, whereby an open space is defined between the legs of each linkage; and wherein one leg on each of the linkages extends into the open space between the legs of the opposite linkage.

2. A wheel suspension according to claim 1, wherein the legs of one linkage are provided with attachment points on the vehicle that are displaced in the longitudinal direction of the vehicle in relation to corresponding attachment points for the legs of said other linkage.

3. A wheel suspension according to claim 1, wherein a leg of one linkage is positioned substantially within the open space of said other linkage.

4. A wheel suspension according to claim 1, wherein said linkages are pivotably journaled in the vehicle.

5. A wheel suspension according to claim 4, wherein said linkages are pivotably journaled around axes that are mainly parallel to the longitudinal direction of the vehicle.

6. A wheel suspension according to claim 1, wherein said second end section of each linkage is connected to a spring means, which spring means is connected to the vehicle.

7. A wheel suspension according to claim 6, wherein said spring means comprises a leaf spring placed transverse to the longitudinal direction of the vehicle.

8. A wheel suspension according to claim 1, wherein said second end section of each linkage is connected to a shock absorber connected to the vehicle.

9. A wheel suspension according to claim 1, wherein said linkages are at least in part made from a resilient material.

10. A wheel suspension according to claim 9, wherein said resilient material comprises a composite material.

11. A wheel suspension according to claim 9, wherein said linkages are rigidly connected to the vehicle.

12. A wheel suspension according to claim 1, wherein a wheel spindle axle is rigidly connected to said second end section of each linkage.

13. A wheel suspension according to claim 1, wherein a wheel spindle is rigidly connected to said second end section of each linkage.

\* \* \* \* \*